United States Patent
Shizuno

(10) Patent No.: US 10,164,939 B2
(45) Date of Patent: Dec. 25, 2018

(54) NETWORK DEVICE, NETWORK DEVICE CONTROL METHOD, AND STORAGE MEDIUM

(71) Applicant: CANON KABUSHIKI KAISHA, Tokyo (JP)

(72) Inventor: Kaori Shizuno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/733,403

(22) Filed: Jun. 8, 2015

(65) Prior Publication Data
US 2015/0271133 A1  Sep. 24, 2015

Related U.S. Application Data

(63) Continuation of application No. 11/845,994, filed on Aug. 28, 2007, now Pat. No. 9,088,464.

(30) Foreign Application Priority Data

Aug. 29, 2006 (JP) .................................. 2006-232814

(51) Int. Cl.
*G06F 15/16* (2006.01)
*H04L 29/12* (2006.01)
(Continued)

(52) U.S. Cl.
CPC .... *H04L 61/2076* (2013.01); *H04L 29/12301* (2013.01); *H04L 29/12915* (2013.01);
(Continued)

(58) Field of Classification Search
CPC ......... H04L 29/12301; H04L 29/12915; H04L 67/10; H04L 61/2076; H04L 61/6059;
(Continued)

(56) References Cited

U.S. PATENT DOCUMENTS 7,734,745 B2 *  6/2010  Gloe ................. H04L 29/12066
                                                              709/223
2004/0037297 A1  2/2004  Ishida et al.
(Continued)

FOREIGN PATENT DOCUMENTS

JP       2003143184 A    5/2003
JP       2004080543 A    3/2004
(Continued)

OTHER PUBLICATIONS

European Office Action issued in European counterpart application No. EP07115164.1, dated Jun. 15, 2015.
(Continued)

*Primary Examiner* — Cheikh T Ndiaye
(74) *Attorney, Agent, or Firm* — Rossi, Kimms & McDowell LLP

(57) ABSTRACT

A network device is available to communicate with an external server managing a combination of an address of a device and identification information identifying the device. The network device selects an address to be registered on the external server from multiple addresses corresponding to the network device and registers the selected address on the external server along with identification information identifying the network device.

17 Claims, 13 Drawing Sheets

(51) Int. Cl.
*H04L 29/06* (2006.01)
*H04L 29/08* (2006.01)

(52) U.S. Cl.
CPC .......... *H04L 61/6059* (2013.01); *H04L 67/10* (2013.01); *H04L 69/16* (2013.01); *H04L 29/1232* (2013.01); *H04L 29/12066* (2013.01); *H04L 61/1511* (2013.01); *H04L 61/2092* (2013.01)

(58) Field of Classification Search
CPC ............... H04L 69/16; H04L 29/12066; H04L 29/1232; H04L 61/2092; H04L 61/1511
See application file for complete search history.

(56) References Cited

U.S. PATENT DOCUMENTS

| | | | |
|---|---|---|---|
| 2004/0083306 A1 | 4/2004 | Gloe | |
| 2006/0056306 A1* | 3/2006 | Iwai | H04L 29/12216 370/252 |
| 2006/0067343 A1 | 3/2006 | Tagawa et al. | |
| 2006/0067495 A1* | 3/2006 | Otsuka | H04M 15/06 379/142.01 |
| 2006/0069807 A1* | 3/2006 | Tagawa | H04L 29/12009 709/245 |
| 2006/0077984 A1* | 4/2006 | Sakai | H04L 29/12066 370/395.52 |

FOREIGN PATENT DOCUMENTS

| | | |
|---|---|---|
| JP | 2004350133 A | 12/2004 |
| JP | 2005151315 A | 6/2005 |
| KR | 1020050045508 A | 5/2005 |

OTHER PUBLICATIONS

Yan, "DNS update in IPv6 stateless configuration; draft-yan-ipv6-ra-dns-00.txt"; Alcatel Shanghai Bell; IETF Standard-Working-Draft, Internet Engineering Task Force, IETF, CH, Jan. 20, 2005; XP015037094 ISSN:0000-0004.
Extended European Search Report issued in EP07115164.1, dated Jan. 8, 2008.
Office Action issued in KR10-2007-0087253, dated Sep. 22, 2008.
Office Action issued in JP2006-232814, dated Jan. 17, 2011.
Office Action issued in JP2011-154256, dated Aug. 31, 2012.
Office Action issued in JP2012-239435, dated Sep. 2, 2013.
Suzuki, "What to do and what not to do with DNS IPv6 settings, an introduction to IPv6 (answer book)", IT media Inc., Jan. 18, 2003, [retrieved on Aug. 27, 2013], URL: http://www.atmarkit.co.jp/ait/articles/0301/18/news002.html.
Office Action issued in U.S. Appl. No. 11/845,994, dated Jun. 29, 2009.
Office Action issued in U.S. Appl. No. 11/845,994, dated Jan. 4, 2010.
Office Action issued in U.S. Appl. No. 11/845,994, dated Sep. 2, 2010.
Office Action issued in U.S. Appl. No. 11/845,994, dated Apr. 1, 2011.
Office Action issued in U.S. Appl. No. 11/845,994, dated Apr. 12, 2012.
Office Action issued in U.S. Appl. No. 11/845,994, dated Mar. 27, 2013.
Office Action issued in U.S. Appl. No. 11/845,994, dated Sep. 25, 2013.
Office Action issued in U.S. Appl. No. 11/845,994, dated Feb. 14, 2014.
Office Action issued in U.S. Appl. No. 11/845,994, dated Sep. 19, 2014.
Notice of Allowance issued in U.S. Appl. No. 11/845,994, dated Mar. 13, 2015.

* cited by examiner

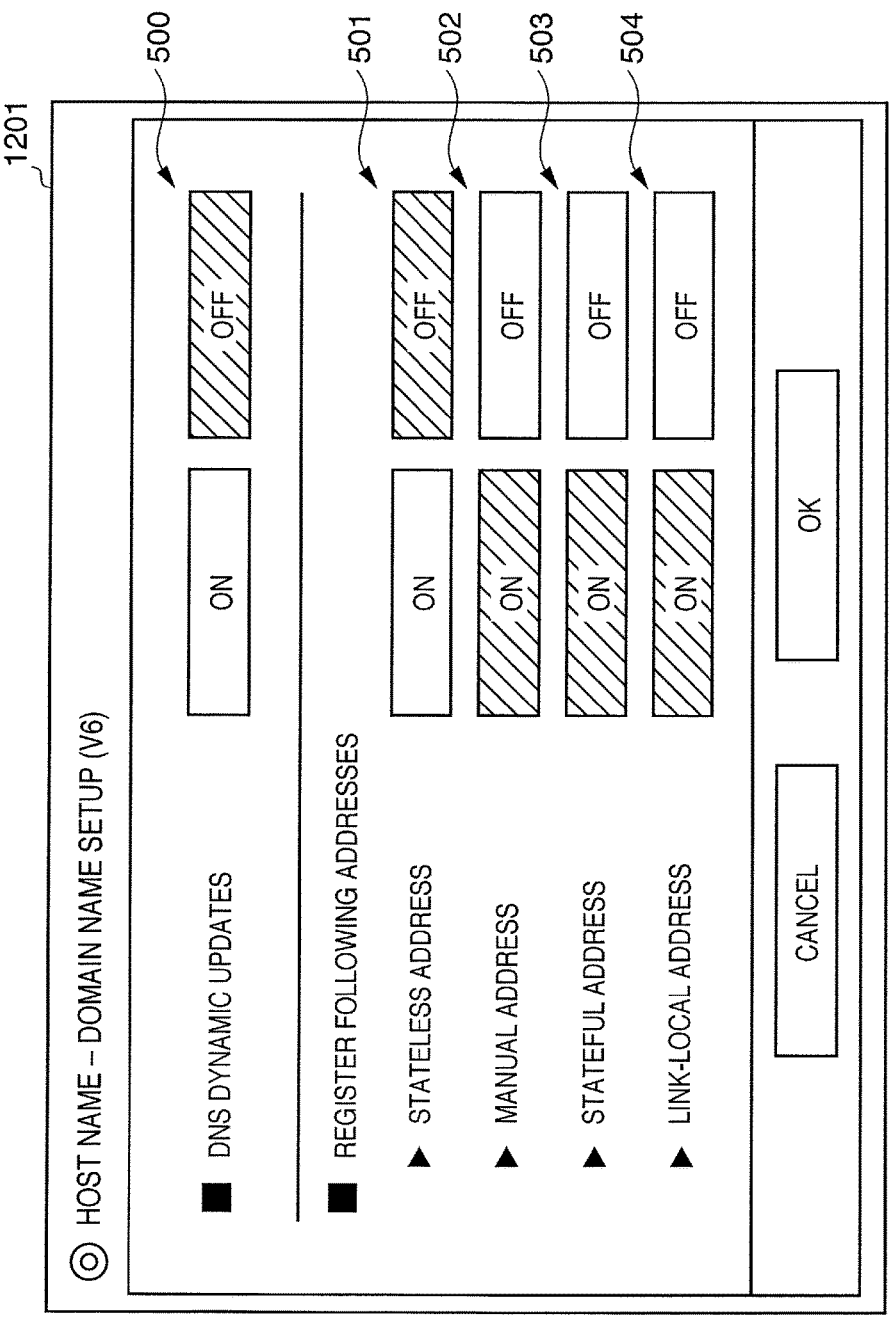

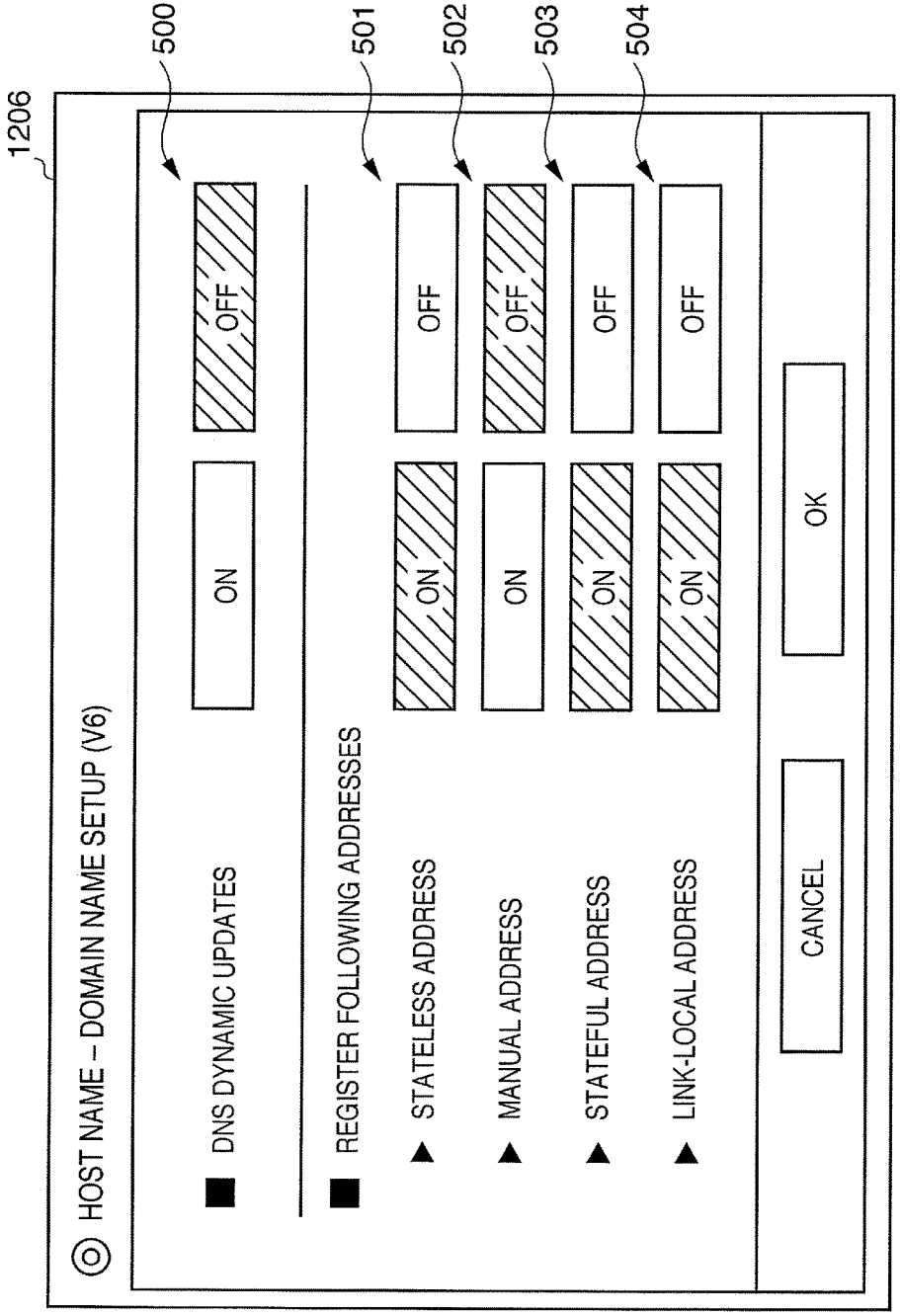

NETWORK DEVICE, NETWORK DEVICE CONTROL METHOD, AND STORAGE MEDIUM

BACKGROUND OF THE INVENTION

Field of the Invention

The present invention relates to a network device that is connected to and communicates with a network, a network device control method, software program, and storage medium.

Description of the Related Art

In order to enhance the ease of use of network devices in the process of network communications, there have been proposed systems in which each network device registers, on a DNS server, a combination of the device's own IP addresses and host names identifying itself. Thus, a proposal aimed at improving the ease of use by registering a combination of IP addresses and host names on a DNS server has been disclosed, for instance, in Japanese Patent Laid-Open No. 2004-350133, which is described below. In the invention disclosed in this document, a second network device that intends to communicate with a first network device only needs to consider the host name of the first network device. Specifying host names for the first network devices makes it possible to acquire the IP addresses of the first network devices from the DNS server and initiate communication using the IP addresses.

However, the conventional technology did not allow users to select the IP addresses registered by network devices on a DNS server. Thus, all the IP addresses belonging to a network device were registered on the DNS server and mapped to host names.

It is contemplated that in the future the spread of IPv6 (Internet Protocol version 6) will lead to an environment in which a single network device will have multiple IP addresses. In such a case, the need to map all the IPv6 addresses the device has to host names will not necessarily arise.

For instance, IPv6 link-local addresses are not suitable for use in wide area networks (WANs). Accordingly, users are sometimes reluctant to permit access to their IPv6 link-local addresses. Nevertheless, if an IPv6 link-local address is mapped to a host name, the IPv6 link-local address may sometimes be acquired when another network device uses the host name to acquire IP addresses. As a result, other network devices end up attempting to access the network device using the IPv6 link-local address.

Furthermore, it is contemplated that in the future security technology will develop and operation will sometimes be carried out in such a manner that a part of communications will be disconnected. For example, when communication utilizing a specific IP address is disconnected, if a communication partner acquires the specific IP address from the DNS server and attempts to establish communication using that specific IP address, unnecessary processing is carried out. Namely, notwithstanding the attempts at communication with the IP address resolved from the host name, the packets will end up being discarded.

SUMMARY OF THE INVENTION

In view of the above, it is desirable to permit selection of addresses to be registered on an external server from among multiple addresses belonging to a network device. It is an object of the present invention to permit prevention of registration of specific addresses on an external server by permitting selection of addresses to be registered on the external server.

According to one aspect of the present invention, there is provided a network device configured to communicate with an external server managing a combination of an address of a device and identification information identifying the device, comprising selecting means configured to select an address to be registered on the external server from a plurality of addresses corresponding to the network device, and registering means configured to register the address selected by the selecting means on the external server along with identification information identifying the network device.

According to a second aspect of the present invention, there is provided a control method for a network device configured to communicate with an external server managing a combination of an address of a device and identification information identifying the device, comprising the steps of selecting an address to be registered on the external server from a plurality of addresses corresponding to the network device, and registering the address selected in the selecting step on the external server along with the identification information identifying the network device.

The present invention makes it possible to avoid registration of specific addresses when a network device registers addresses on an external server.

Further features of the present invention will become apparent from the following description of exemplary embodiments with reference to the attached drawings.

BRIEF DESCRIPTION OF THE DRAWINGS

FIGS. 12A and 12B are GUI screen views showing a user interface allowing an MFP (multi-function peripheral) with multiple host names according to an embodiment of the present invention to select address scopes to be registered on a DNS server separately for each host name.

DESCRIPTION OF THE EMBODIMENTS

Figure 1:
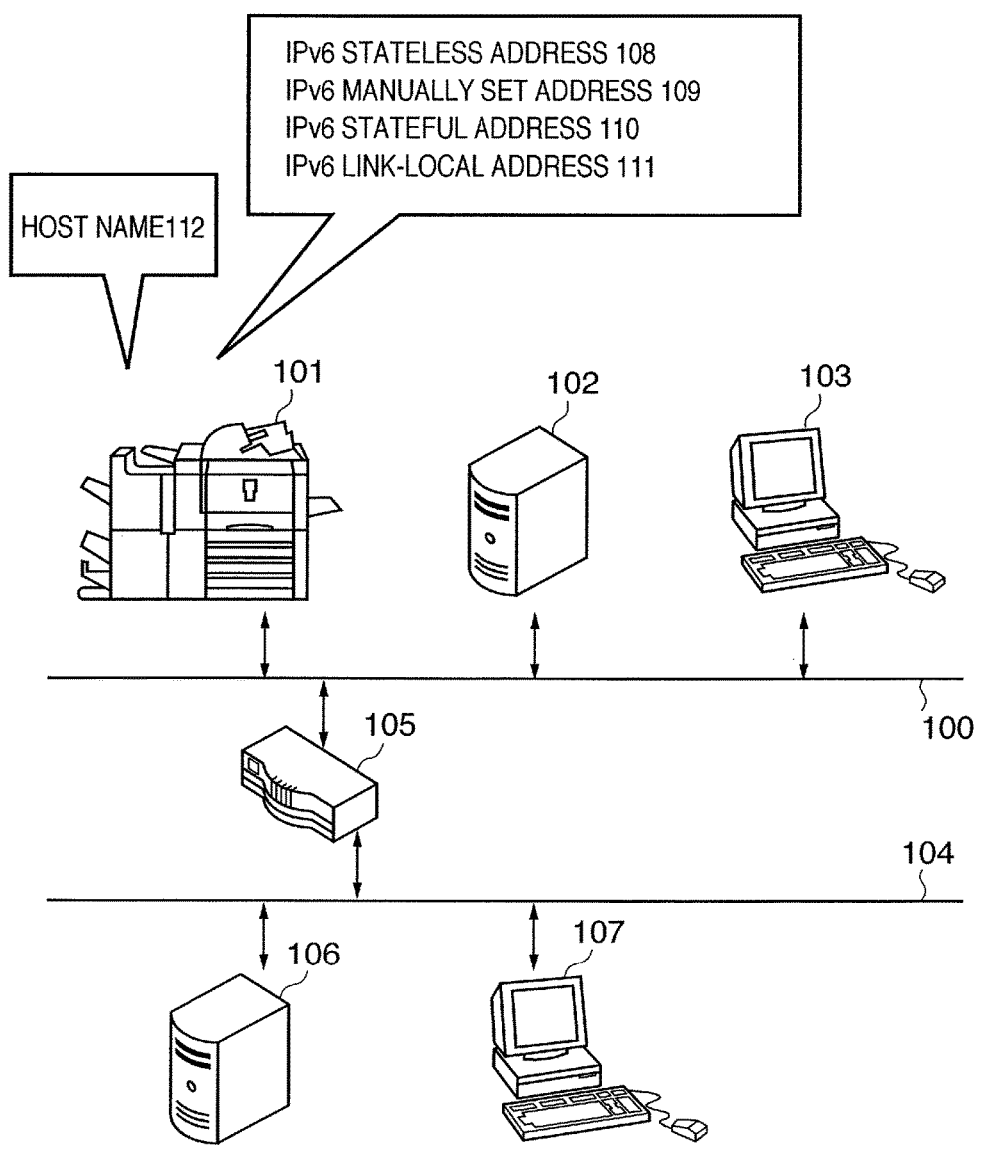
FIG. 1 is a schematic diagram, in which a network device according to an embodiment of the present invention, that is, an MFP (multi-function peripheral) provided with a network connection, is connected to the Internet.

Below, detailed explanations are provided with reference to the attached drawings regarding a network device according to an embodiment of the present invention. FIG. 1 is a schematic diagram, in which a network device according to an embodiment of the present invention, that is, an MFP (multi-function peripheral) provided with a network connection, is connected to the Internet.

An MFP (101) capable of connecting to the Internet, provides network printing services and network scanning services to other network devices through a network, 100. Furthermore, the MFP 101 is connected to another network 104 via a router 105 and provides network printing services and network scanning services to other network devices connected to the other network 104.

The following four address scopes are available for use by the MFP 101 in order to perform IPv6-based communication on the network 100 and on the other network 104.

An IPv6 stateless address 108, an IPv6 manually set address 109, an IPv6 stateful address 110, and an IPv6 link-local address 111.

In addition to the above-mentioned addresses, a host name 112, is assigned to the MFP 101 in order to identify the MFP 101.

A DNS server 102, which is connected to the network 100, maps the IP addresses and host names of network devices residing on the network 100.

A communication terminal 103, which is a network device, is a general-purpose personal computer communicating with the MFP 101 by connecting to the network 100, and is capable of utilizing the functionality (services) offered by the MFP 101.

In addition, a DNS server 106, which is connected to the other network 104, maps the IP addresses and host names of the network devices residing on the other network 104.

A communication terminal 107, which is a network device, is a general-purpose personal computer, as the communication terminal 103. The communication terminal 107 is connected to the other network 104, and, furthermore, communicates with the MFP 101 via the router 105 and is capable of utilizing the functionality (services) offered by the MFP 101.

In the network system configuration illustrated in FIG. 1, the MFP 101 registers its own device's host name and IPv6 addresses on the DNS server 102 connected to the network 100 and on the DNS server 106 connected to the other network 104. At such time, the user of the MFP 101 can select the device's IP addresses registered on the DNS server 102 and on the DNS server 106 by appropriately using the user interface.

It should be noted that in the present embodiment the MFP 101 is configured in the following manner. It should be noted that this configuration is used for the purpose of explaining the embodiment and it is not implied that that such a configuration has to be used.

Due to network security considerations, a) the MFP 101 does not receive packets addressed to its own device's IPv6 link-local address, and b) its own device's IPv6 manually set address is an address that can be used only on the network 100. The MFP 101 does not receive packets sent from networks other than the network 100 to its own device's IPv6 manually set address.

The communication terminal 103 connected to the network 100 accesses the DNS server 102, specifies the host name of the MFP 101, and acquires the IPv6 addresses of the MFP 101. In addition, the communication terminal 107 connected to the network 104 accesses the DNS server 106, specifies the host name of the MFP 101, and acquires the IPv6 addresses of the MFP 101.

Figure 2:
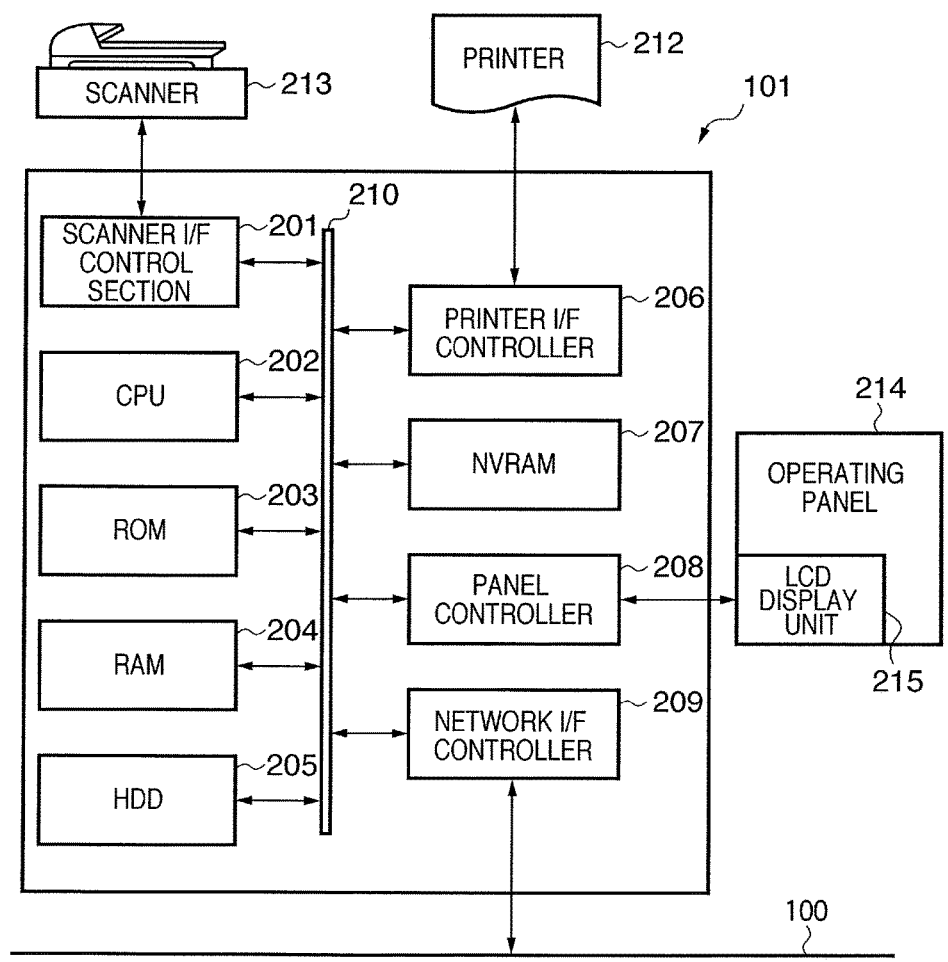
FIG. 2 is a block diagram illustrating the hardware configuration of an MFP (multi-function peripheral) according to an embodiment of the present invention.

FIG. 2 is a block diagram schematically illustrating the hardware configuration of the MFP 101 according to the first embodiment of the present invention. In FIG. 2, a scanner I/F control section 201 controls a scanner 213. In addition, a printer I/F controller 206 controls a printer 212.

A CPU 202 executes a software program for controlling the printer 212 and scanner 213, etc., and controls the entire MFP 101. A ROM 203, which is a read-only memory, stores fixed parameters, programs controlling the scanner 213, the printer 212, and the boot program of the MFP 101, etc.

A RAM 204 is a random-access memory used for the storage of temporary data etc. when the CPU 202 controls the MFP 101. A HDD 205 is a hard disk drive used for the storage of various data, such as for the storage of print data, etc. An NVRAM 207 is a non-volatile memory used for storing various set values for the printer 212, scanner 213, etc. It should be noted that address information describing the multiple IP addresses allocated to the MFP 101 is stored in the NVRAM 207 and HDD 205.

A panel controller 208, controls an operating panel 214, which is provided with an LCD display unit 215, and controls the display of various information items and input of instructions by the user. A network I/F controller 209 controls transmission and reception of data to/from the network 100. The scanner I/F control section 201, CPU 202, ROM 203, RAM 204, HDD 205, printer I/F controller 206, NVRAM 207, panel controller 208, and network I/F controller 209, etc. are interconnected by a bus 210. In other words, this is a system bus used for sending and receiving control signals from the CPU 202 and data signals between the various units.

Figure 3:
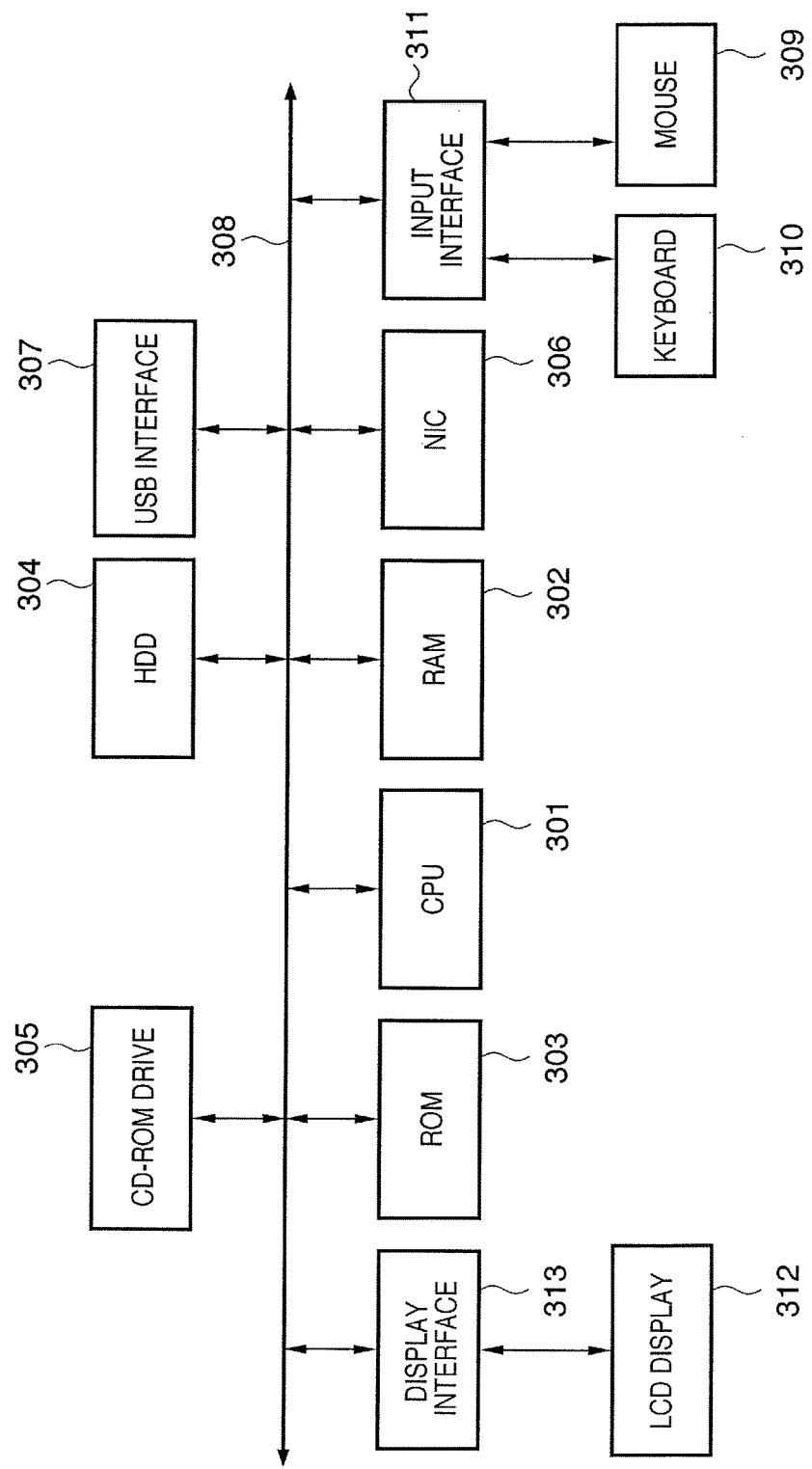
FIG. 3 is a block diagram illustrating a DNS server and a communication terminal according to an embodiment of the present invention.

FIG. 3 is a basic hardware configuration chart of the DNS servers 102 and 106 and communication terminals 103 and 107. These are general-purpose servers and computer systems based on general-purpose personal computers. As shown in FIG. 3, they have the following configuration. Namely, a CPU (Central Processing Unit) 301 is provided for use as a computing unit. Moreover, a RAM (Random Access Memory) 302, a ROM (Read Only Memory) 303, and a HDD (Hard Disk Drive) 304 are provided as storage units. In addition, a CD-ROM (Compact Disk Read-Only Memory) drive 305 is provided as an external storage unit. Also, a NIC (Network Interface Card) 306 and a USB (Universal Serial Bus) interface 307 are provided as external interfaces. A bus 308 is provided for interconnecting these hardware devices and peripheral devices. In addition, a mouse 309 and a keyboard 310 are connected to the main body of the system as peripheral equipment via an input interface 311. Furthermore, an LCD display 312 is connected through a display interface 313.

Software used on these devices includes an OS (Operating System), with server software, word processing, spreadsheet, and e-mail software, etc. installed depending on the intended use. The OS is provided with a port monitor, whose function is to transmit print data to a printer (not shown) and MFP 101 through the networks, that is, the networks 100 and 104. As a matter of course, the communication terminals 103 and 107 are capable of IPv6-based communication.

Figure 4:
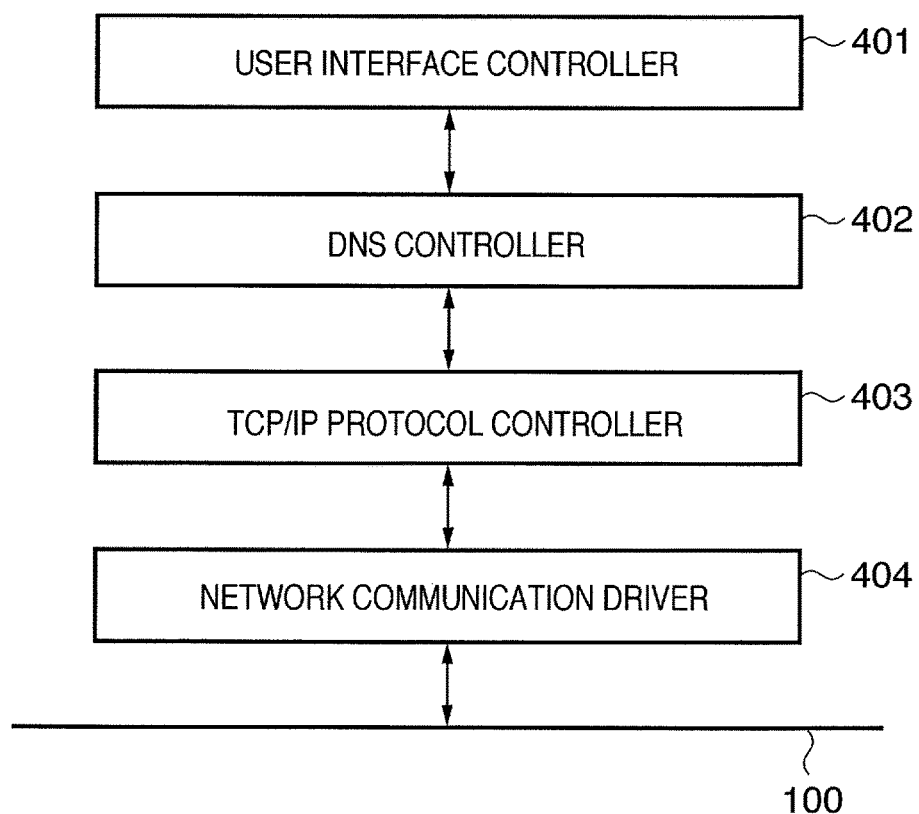
FIG. 4 is a conceptual block diagram illustrating the software configuration concept of an MFP (multi-function peripheral) according to an embodiment of the present invention.

FIG. 4 is a conceptual block diagram illustrating the software configuration concept of the MFP 101 according to an embodiment of the present invention. In FIG. 4, a user interface controller 401 is a module controlling functions related to user operations. This module controls the panel controller 208 and manages output to/input from the user utilizing the operating panel 214 provided with the LCD display unit 215.

A DNS controller 402 is a module exercising DNS and dynamic DNS protocol control based on data input by the user. A network communication driver 404 controls the network I/F controller 209 and exercises control over transmission and reception of data with the network 100. A TCP/IP protocol controller 403 is provided with a module controlling the TCP/IP protocol and uses the network communication driver 404 to exercise control over the transmission and reception of data based on the TCP/IP protocol.

Figure 5:
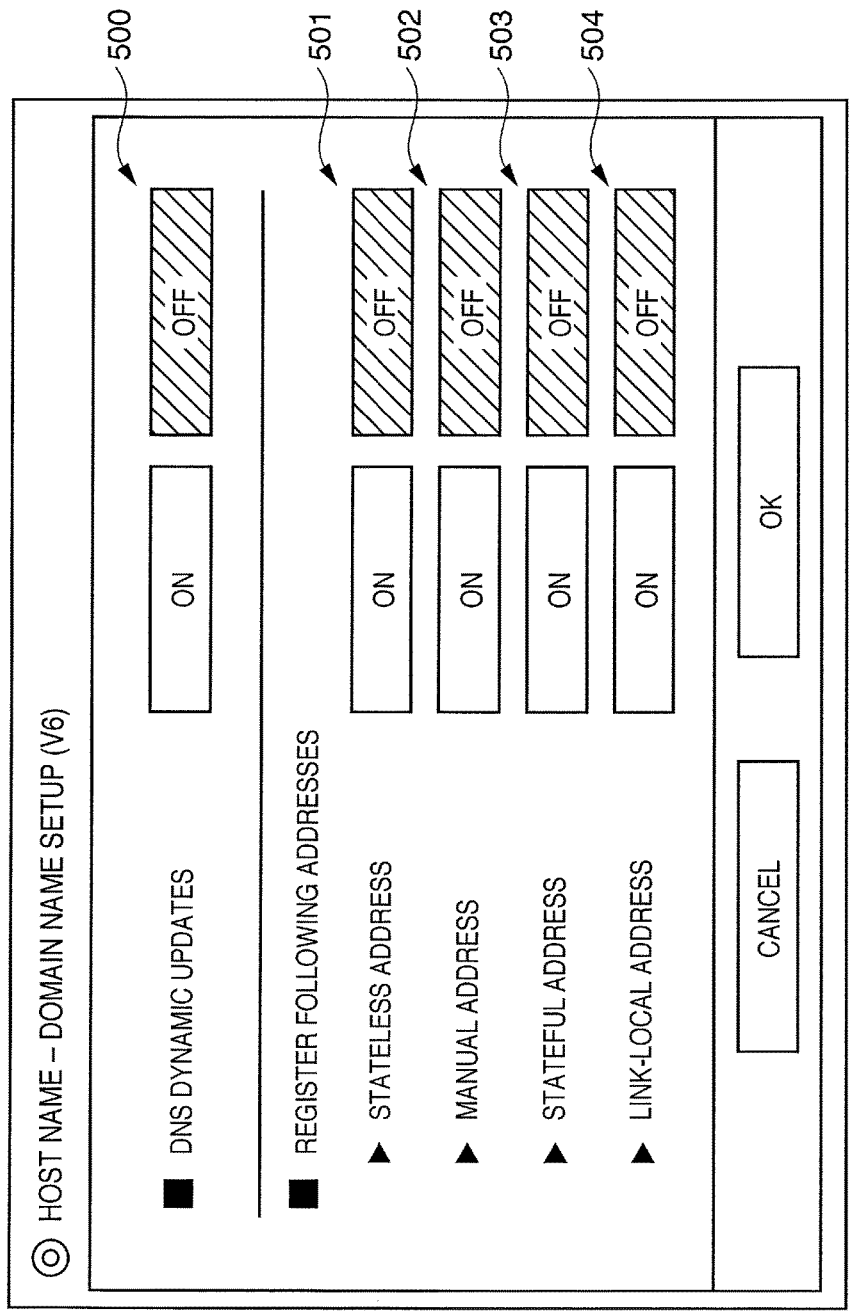
FIG. 5 is a diagram illustrating an example of a GUI (graphic user interface) screen displayed on the display unit of an MFP (multi-function peripheral) according to an embodiment of the present invention.

FIG. 5 is an exemplary setup screen for the GUI (graphic user interface) displayed on the LCD display unit 215 of the MFP 101 in the present embodiment. The GUI of FIG. 5 is provided with images for the following buttons.

Buttons 500, which are used to issue instructions to enable or disable dynamic updates in the dynamic DNS function; buttons 501, which are used to issue instructions as to whether to register the its own device's IPv6 stateless address on the specified DNS server when dynamic updates in the dynamic DNS function are enabled; buttons 502, which are used to issue instructions as to whether to register the its own device's IPv6 manually set address on the specified DNS server when dynamic updates in the dynamic DNS function are enabled; buttons 503, which are used to issue instructions as to whether to register the its own device's IPv6 stateful address on the specified DNS server when dynamic updates in the dynamic DNS function are enabled, and buttons 504, which are used to issue instructions as to whether to register the its own device's IPv6 link-local address on the specified DNS server when dynamic updates in the dynamic DNS function are enabled.

The "ON" buttons illustrated in FIG. 5 are used to issue instructions to register address scopes corresponding to the buttons on the DNS server, and the "OFF" buttons are used to issue instructions not to register the address scopes corresponding to the buttons on the DNS server. Hatching is applied to disabled buttons. Based on instructions from enabled buttons, the MFP 101 selects the address scopes, for which the "ON" buttons are enabled, as the address scopes to be registered on the DNS server.

A touch panel (not shown), which is incorporated into the LCD display unit 215, is configured to permit entry by pressing the buttons on the GUI with a finger. Quite naturally, it does not need to be a touch panel arrangement, and keys, or a trackball, etc. provided on the operating panel 214 can be used for effecting cursor movement and entry using the desired buttons.

Figure 6:
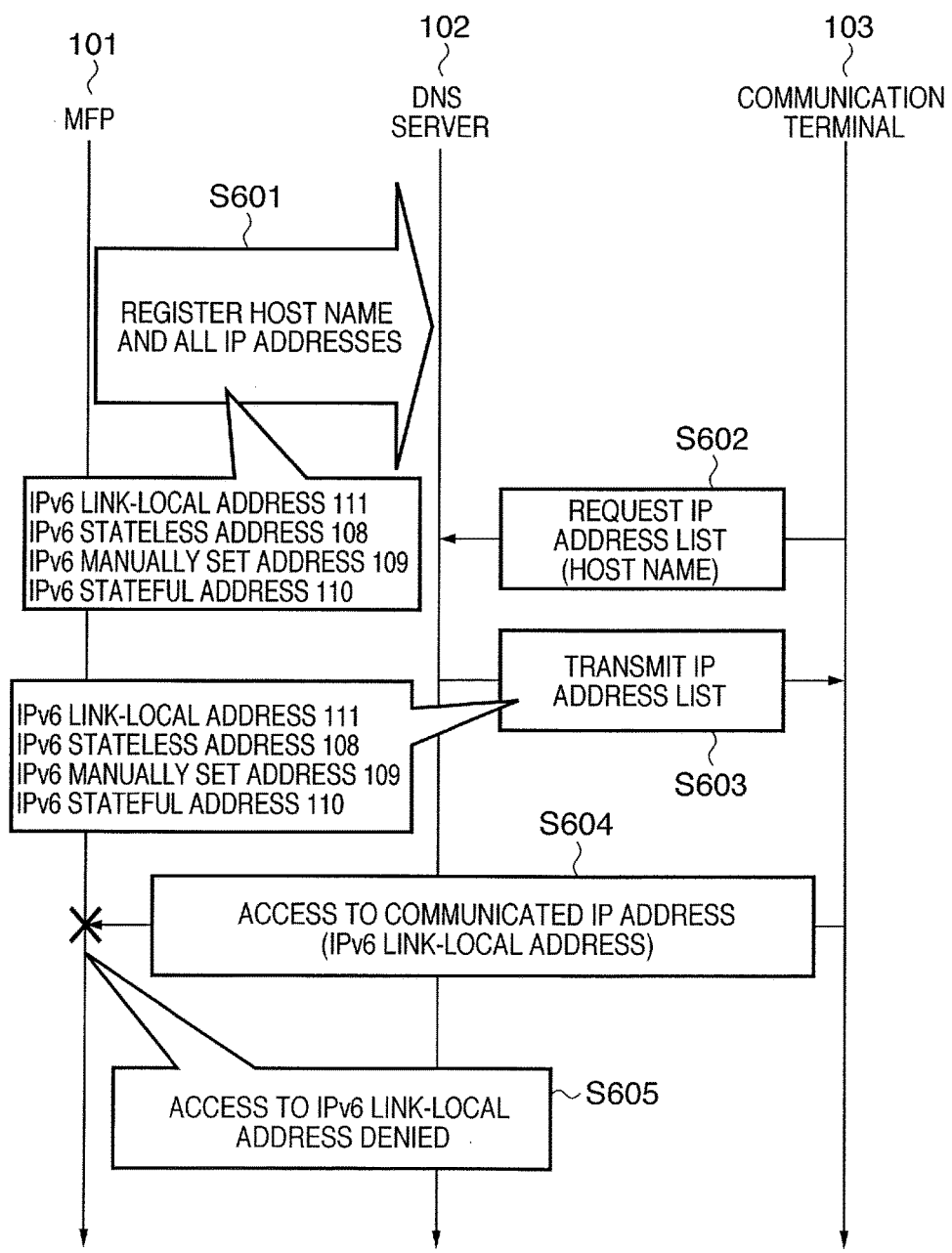
FIG. 6 is a diagram illustrating the DNS processing sequence of an MFP (multi-function peripheral) to which an embodiment of the present invention is not applied in the network environment of FIG. 1 in a situation, where communication has not been established.

FIG. 6 shows the DNS processing sequence used in the network system environment illustrated in FIG. 1. This illustrates the operation of the MFP 101, DNS server 102, and communication terminal 103 in a situation, where the MFP 101 registers the IP addresses of all the address scopes it has on the DNS server 102 as its own device's IP addresses.

First of all, in Step S601, the MFP 101 registers the IP addresses of all the address scopes it has on the DNS server 102 as its own device's IP addresses.

As previously explained, due to network security considerations, the MFP 101 is set up such that it does not receive packets addressed to its own device's IPv6 link-local address. In other words, access to the IPv6 link-local address 111 is not permitted.

Next, in Step S602, the communication terminal 103 specifies the host name corresponding to the MFP 101 and requests an IP address list. Then, in Step S603, the DNS server 102 communicates an IP address list including the IPv6 link-local address 111 of the MFP 101 to the communication terminal 103.

On the communication terminal 103, at least one IP address is selected from the IP address list and an attempt at communication is made in Step S604. For example, an attempt is made to access the IPv6 link-local address included in the IP address list communicated by the DNS server 102. However, in this case, the MFP 101 ends up refusing that access (Step S605) and the communication terminal 103 cannot communicate with the MFP 101. Thus, there is a chance that unnecessary communication is carried out.

Figure 9:
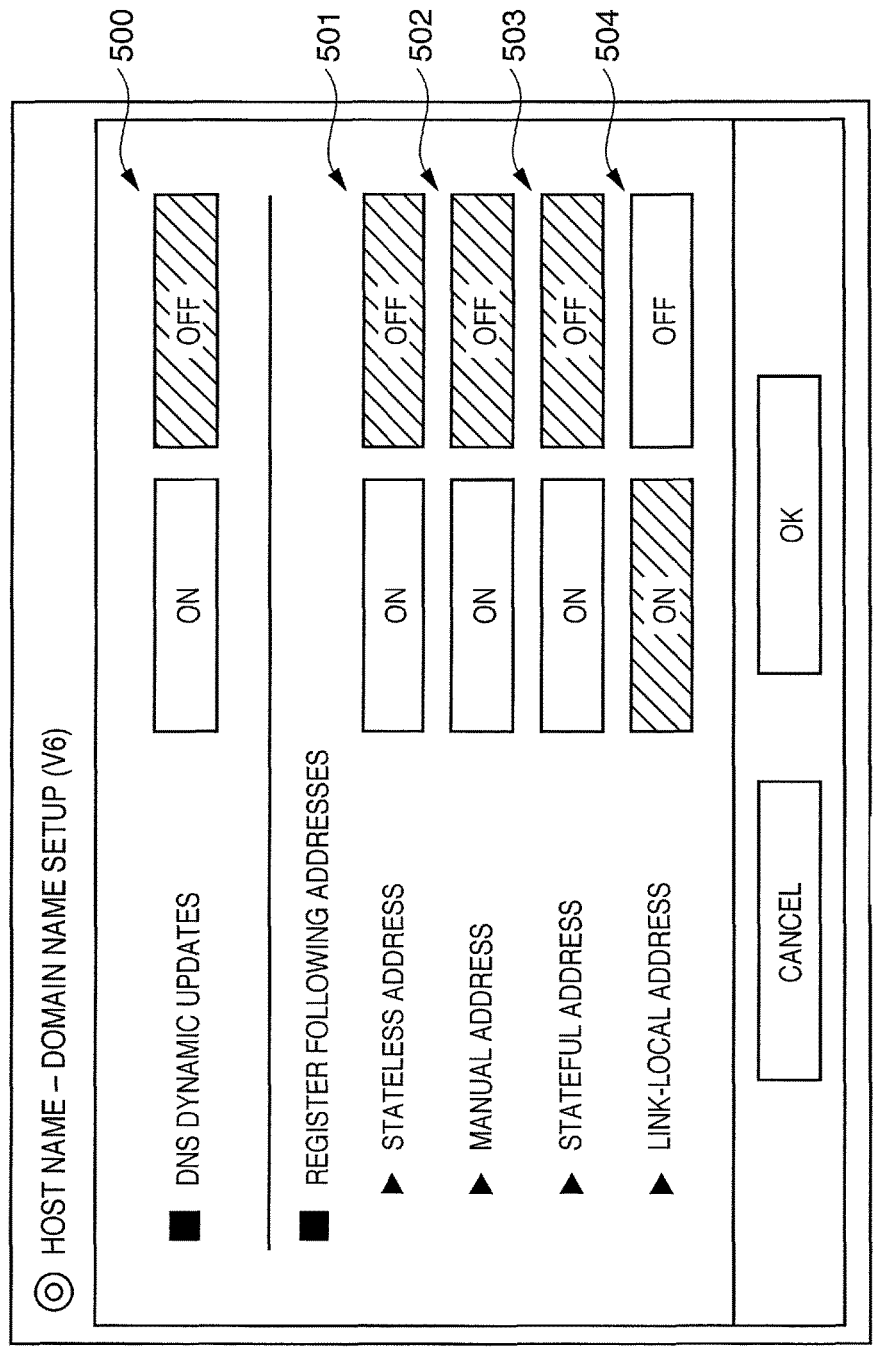
FIG. 9 is a GUI screen view illustrating a GUI screen serving as a user interface configured during selection of address scopes communicated to a DNS server by an MFP (multi-function peripheral) according to an embodiment of the present invention.

FIG. 9 illustrates an example of another setup screen.

The MFP 101 receives packets transmitted to its own device's IPv6 stateless address from network devices on the network 100, including the communication terminal 103. Therefore, the buttons 501, which are used to issue instructions as to the registration of its own device's IPv6 stateless address on the DNS server 102, have the "ON" button enabled.

The MFP 101 receives packets transmitted to its own device's IPv6 manually set address from network devices on the network 100, including the communication terminal 103. Therefore, the buttons 502, which are used to issue instructions as to the registration of its own device's IPv6 manually set address on the DNS server 102, have the "ON" button enabled.

The MFP 101 receives packets transmitted to its own device's IPv6 stateful address from network devices on the network 100, including the communication terminal 103. Therefore, the buttons 503, which are used to issue instructions as to the registration of its own device's IPv6 stateful address on the DNS server 102, have the "ON" button enabled.

However, the MFP 101 does not receive packets transmitted to its own device's IPv6 link-local address from network devices on the network 100, including the communication terminal 103. Therefore, the buttons 504, which are used to issue instructions as to the registration of its own device's IPv6 link-local address on the DNS server 102, have the "ON" button disabled. It should be noted that, in FIG. 9, hatching is applied to the disabled buttons.

Figure 8:
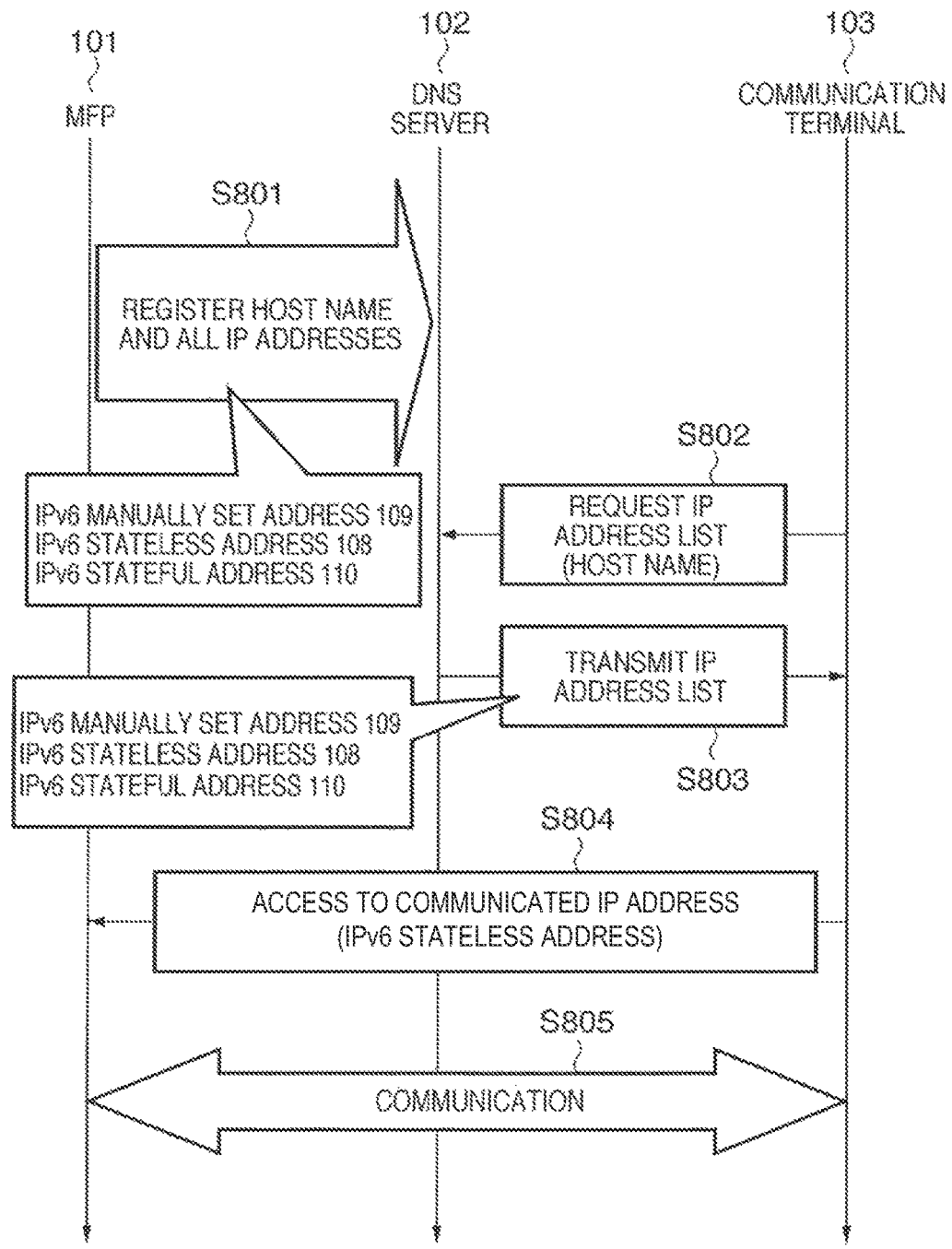
FIG. 8 is a diagram illustrating the DNS processing sequence of an MFP (multi-function peripheral) according to an embodiment of the present invention in the network environment of FIG. 1.

FIG. 8 illustrates the operation of the MFP 101, DNS server 102, and communication terminal 103 in a situation, where the MFP 101 registers the IP addresses of some of the address scopes on the DNS server 102. Here, the IPv6 link-local address is prevented from being registered on the DNS server 102.

First of all, in Step S801, the MFP 101 registers IP addresses other than those of the IPv6 link-local address on the DNS server 102 as its own device's IP addresses. Next, in Step S802, the communication terminal 103 specifies the host name corresponding to the MFP 101 and requests an IP address list. Then, in Step S803, the DNS server 102 communicates an IP address list including the IP addresses of the MFP 101 other than the IPv6 link-local address 111 to the communication terminal 103.

On the communication terminal 103, at least one IP address is selected from the IP address list and an attempt at communication is made in Step S804. For example, an attempt is made to communicate with the IPv6 stateless address 108 of the MFP 101 included in the IP address list communicated by the DNS server 102. As shown in S805, this initiates communication between the MFP 101 and communication terminal 103. Unlike in the example of FIG. 6, the communication terminal 103 is capable of communicating with usable IP addresses. This is due to the fact that the IPv6 link-local address 111, access to which is not permitted by the MFP 101, is not registered on the DNS server 102 and only actually usable IP addresses are communicated to the communication terminal 103.

Figure 7:
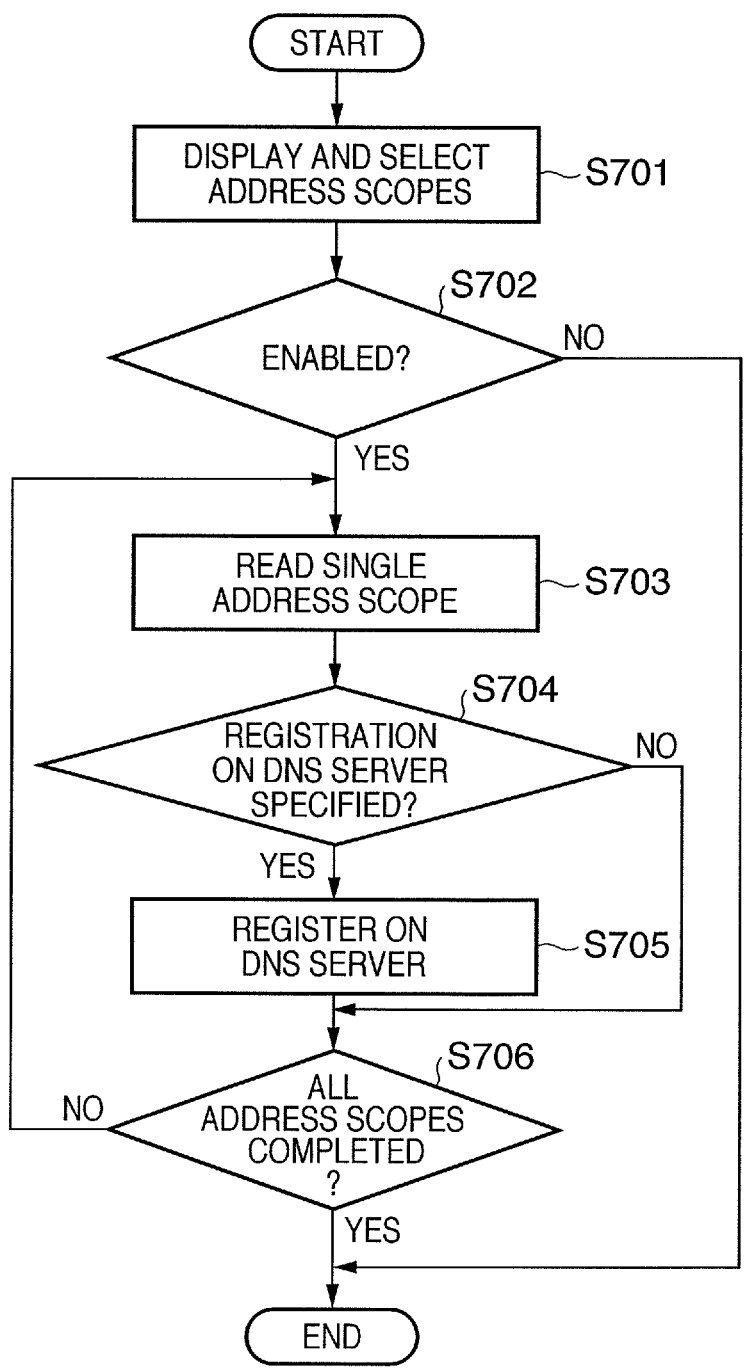
FIG. 7 is a flow chart describing operations taking place during address registration on a DNS server by an MFP (multi-function peripheral) according to an embodiment of the present invention. The processing shown in the flow chart of FIG. 7 is performed by CPU 202 in MFP 101.

FIG. 7 shows the flow of processing that takes place when the MFP 101 registers IP addresses on the DNS server. In Step S701, the MFP 101 displays the setup screen explained in FIG. 5 on the LCD display unit 215 controlled by the user interface controller 201. On this setup screen, the user issues instructions regarding enabling or disabling the dynamic DNS function or selects the address scopes the user intends to register on the DNS server.

When the OK button is pressed by the user on the setup screen, in Step S702, the MFP 101 determines whether an instruction to enable the dynamic DNS function has been issued. If an instruction to enable the dynamic DNS function has not been issued, in other words, if an instruction to disable the dynamic DNS function has been issued, the registration process is terminated because there is no need to register IP addresses on the DNS server.

On the other hand, if an instruction to enable the dynamic DNS function is issued, the program proceeds to Step S703 and the MFP 101 reads the multiple address scopes one by one. Then, in Step S704, determination is made with respect to the read-out address scope so as to determine whether the address scope has been specified as the address scope registered on the DNS server. If it has been specified that the read-out address scope is registered on the DNS server, the program proceeds to Step S705 and the MFP 101 registers the IP address belonging to the address scope on the DNS server.

On the other hand, if it has not been specified that the read-out address scope is registered on the DNS server, the program proceeds to Step S706 without registering the IP address belonging to the address scope on the DNS server. In other words, the MFP 101 selects the addresses belonging to the address scopes, for which the "ON" buttons have been enabled on the setup screen, as addresses to be registered on the DNS server, and registers the selected addresses on the DNS server.

In Step S706, the MFP 101 determines whether processing of all the address scopes is complete. If processing all the address scopes is complete, the registration process is terminated. However, if it is not complete, the program returns to Step S703 and the next address scope is read out.

Figure 11:
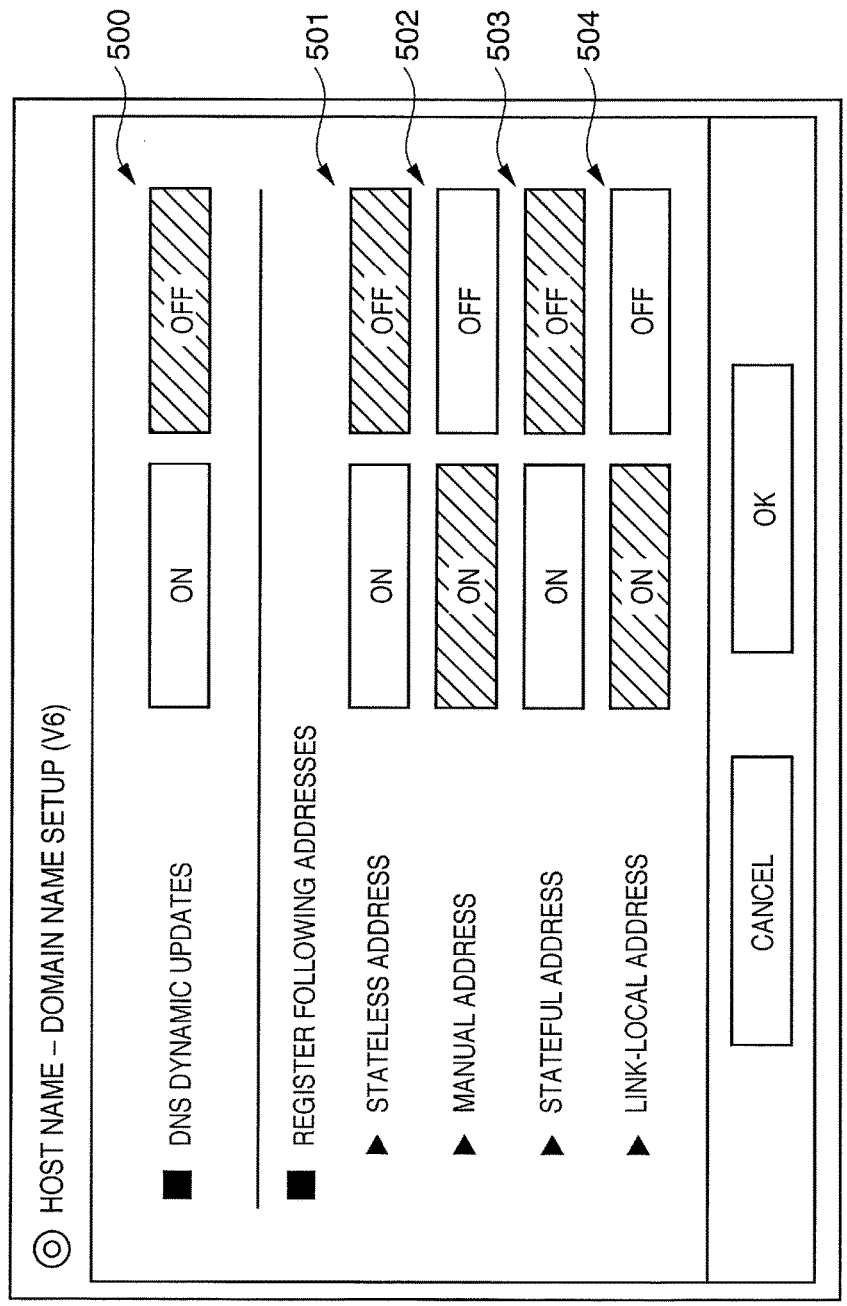
FIG. 11 is a GUI screen view illustrating a user interface configured during selection of address scopes communicated to a DNS server by an MFP (multi-function peripheral) according to an embodiment of the present invention.

The MFP 101 may be provided with a different setup screen for each DNS server. FIG. 11 illustrates a setup screen corresponding to the DNS server 106. Here, the IPv6 link-local address 111, access to which is not permitted by the MFP 101, is not registered on the DNS server 106. Moreover, the IPv6 manually set address 109, which is an address usable only on the network 100, is not registered on the DNS server 106 either. In this manner, only a list of actually usable IP addresses is communicated to the communication terminal 107 and the communication terminal 107 can communicate with usable IP addresses.

Namely, FIG. 11 is a GUI screen illustrating a user interface used to select address scopes registered by the MFP 101 on the DNS server 106. In the same manner as in FIG. 9, hatching is applied to disabled buttons.

The MFP 101 receives packets transmitted to its own device's IPv6 stateless address from network devices on the network 104, including the communication terminal 107. Therefore, the buttons 501, which are used to issue instructions as to the registration of its own device's IPv6 stateless address on the DNS server 106, have the "ON" button enabled.

The MFP 101 does not receive packets transmitted to its own device's IPv6 manually set address from network devices on the network 104, including the communication terminal 107. Therefore, the buttons 502, which are used to issue instructions as to the registration of its own device's IPv6 manually set address on the DNS server 106, have the "ON" button disabled.

The MFP 101 receives packets transmitted to its own device's IPv6 stateful address from network devices on the network 104, including the communication terminal 107. Therefore, the buttons 503, which are used to issue instructions as to the registration of its own device's IPv6 stateful address on the DNS server 106, have the "ON" button enabled.

Furthermore, the MFP 101 does not receive packets transmitted to its own device's IPv6 link-local address from network devices on the network 104, including the communication terminal 107. Therefore, the buttons 504, which are used to issue instructions as to the registration of its own device's IPv6 link-local address on the DNS server 106, have the "ON" button disabled.

Figure 10:
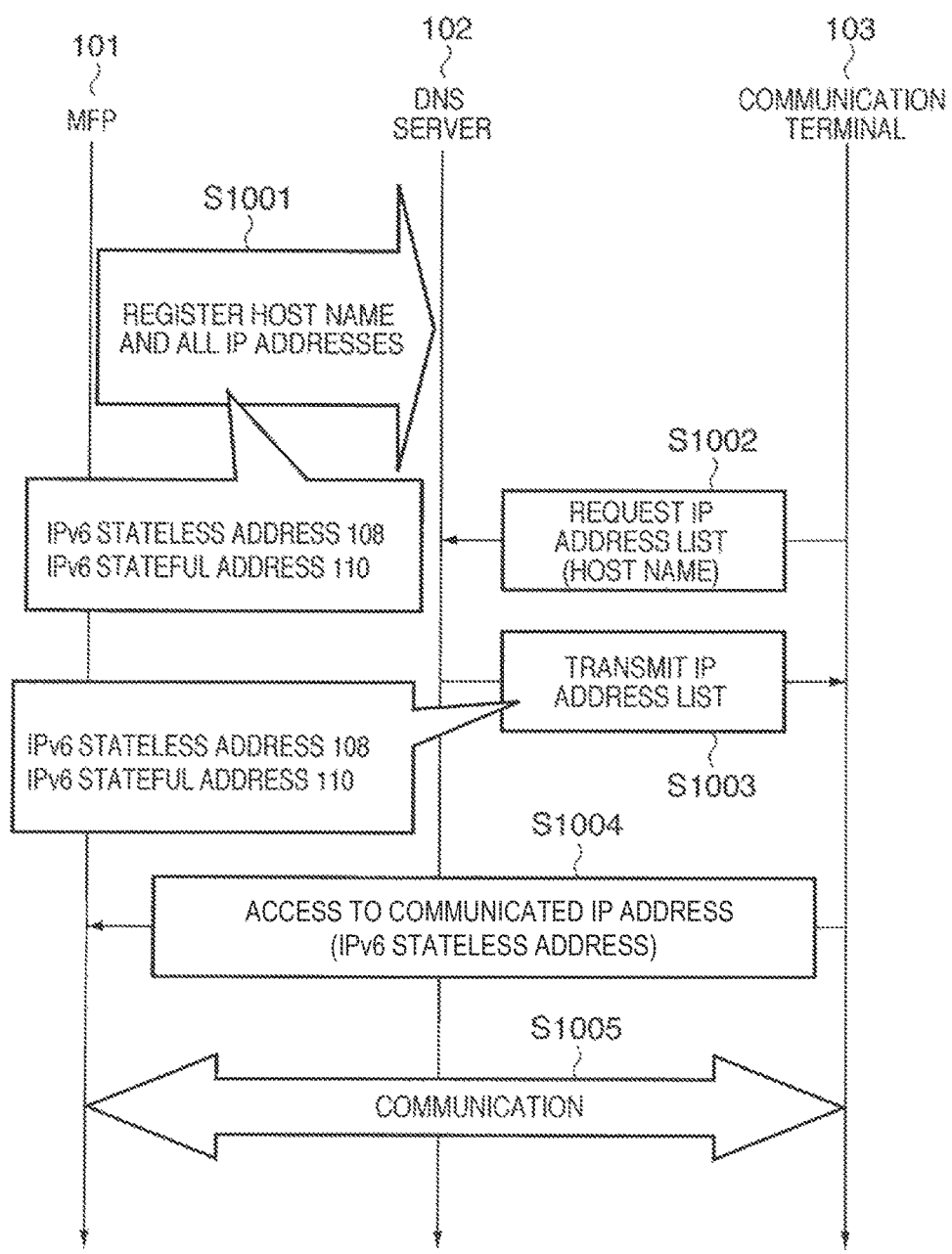
FIG. 10 is a diagram describing operation during address registration on another DNS server by an MFP (multi-function peripheral) according to an embodiment of the present invention.

FIG. 10 illustrates the operation of the MFP 101, DNS server 106, and communication terminal 107 in a situation where the address scopes registered on the DNS server 106 are selected as shown in FIG. 11.

First of all, in Step S1001, the MFP 101 registers IP addresses other than the IPv6 link-local address 111 and IPv6 manually set address 109 on the DNS server 106 as its own device's IP addresses.

Next, in Step S1002, the communication terminal 107 specifies the host name corresponding to the MFP 101 and requests an IP address list. Then, in Step S1003, the DNS server 106 communicates an IP address list including the IP addresses of the MFP 101 other than the IPv6 link-local address 111 and IPv6 manually set address 109 to the communication terminal 107.

On the communication terminal 107, at least one IP address is selected from the IP address list and an attempt at communication is made in Step S1004. For example, an attempt is made to communicate with the IPv6 stateless address 108 of the MFP 101 included in the IP address list communicated by the DNS server 106. As shown in S1005, this initiates communication between the MFP 101 and communication terminal 107.

FIGS. 12A and 12B illustrate a case in which a host name different from the host name 112 (for instance, host name 1200) is configured for the MFP 101 so that the MFP 101 has multiple host names, and address scopes registered on the DNS server 102 are selected for each host name separately. In other words, FIGS. 12A and 12B show GUI screens illustrating the user interfaces utilized in such a case. In the present embodiment, mapping is carried out between the host name 112 of the MFP 101 and the IPv6 stateless address 108 of the MFP 101. In addition, mapping is performed between the host name 1200 of the MFP 101 and the IPv6 manually set address 109 of the MFP 101.

In FIG. 12A, key 1201 designates a GUI screen illustrating a user interface used for selecting address scopes, for which mapping to the host name 112 is performed. Only the IPv6 stateless address is used as the IP address mapped to the host name 112. Therefore, the button 501, which is used to issue instructions to register its own device's IPv6 stateless address on the DNS server 102, is enabled. For the same reason, the button 502, which is used to issue instructions to register its own device's IPv6 manually set address on the DNS server 102, is disabled. For the same reason, the button 503, which is used to issue instructions to register its own device's IPv6 stateful address on the DNS server 102, is disabled. For the same reason, the button 504, which is used to issue instructions to register its own device's IPv6 link-local address on the DNS server 102, is disabled.

In FIG. 12B, 1206 is a GUI screen illustrating a user interface used for selecting address scopes, for which mapping to the host name 1200 is performed. Only the IPv6 manually set address is used as the IP address mapped to the host name 1200. Therefore, the button 501, which is used to issue instructions to register its own device's IPv6 stateless address on the DNS server 102, is disabled. For the same reason, the button 502, which is used to issue instructions to register its own device's IPv6 manually set address on the DNS server 102, is enabled. For the same reason, the button 503, which is used to issue instructions to register its own device's IPv6 stateful address on the DNS server 102, is disabled. For the same reason, the button 504, which is used to issue instructions to register its own device's IPv6 link-local address on the DNS server 102, is disabled.

The above-described embodiment illustrated a case in which the MFP 101 was registered on the DNS servers 102 or 106. However, the invention can be realized in a similar manner even in cases wherein the IP addresses of the communication terminals 103 and 107 are registered on the DNS servers 102 and 106. In such cases, the GUI screens shown in FIGS. 5, 9, 11, and 12A, 12B will be displayed, for example, on the LCD display 312 of FIG. 3. Moreover, each button on the GUI screens will be selected using the mouse 309 and keyboard 310.

In addition, the object of the present invention can be attained by providing the system or apparatus with a storage medium storing software program code implementing the functionality of the above-described embodiment. Needless to say, it will be attained by reading and executing the program code stored on the storage medium by the computer (or CPU, MPU) of the apparatus or system. In such a case, the program code read from the storage media will implement the functionality of the above-described embodiment and therefore the storage media, on which the program code is stored, will form part of the present invention.

Flexible disks, hard disks, optical disks, magneto-optical disks, CD-ROMs, CD-Rs, magnetic tape, nonvolatile semiconductor memory cards, ROM, and the like can be utilized as the storage media used to supply the program code. Moreover, the functionality of the above-described embodiment is sometimes implemented by executing program code read by a computer.

However, the invention also includes cases in which the functionality of the above-described embodiment is implemented when an OS (operating system) or the like running on a computer partially or entirely carries out actual processing based on the instructions of the program code.

Furthermore, there may be cases in which the program code read from the storage media is written to memory provided in an expansion board inserted into a computer or an expansion unit connected to a computer. It goes without saying that the invention also includes cases in which a CPU, or the like provided in the expansion board or expansion unit then partially or entirely executes actual processing based on the instructions of the program code and the functionality of the above-described embodiment is implemented based on this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-232814, filed Aug. 29, 2006, which is hereby incorporated by reference herein in its entirety.

What is claimed is:

1. A network system for performing IPv6-based communication, the system comprising:
   a first network device connected to a Domain Name System (DNS) server via a network; and
   a second network device,
   wherein the first network device is associated with a plurality of IPv6 addresses and comprises:
   at least one memory device that stores a first set of instructions; and
   at least one processor communicatively connected to the at least one memory device of the first network device and configured by the first set of instructions to:
      display at least some of a plurality of types of IPv6 addresses as available for user designation for registration in the DNS server;
      receive a user instruction selecting, from the display of the at least some of the plurality of types of IPv6 addresses available for user designation for registration in the DNS server, a type of IPv6 address to be registered in the DNS server, wherein a user is permitted to select by the user instruction less than all of the plurality of types of IPv6 addresses;
      determine whether or not a dynamic DNS function has been enabled;
      determine at least one IPv6 address of the plurality of IPv6 addresses associated with the first network device, the at least one IPv6 address corresponding to the type selected in accordance with the user instruction; and
      request, via the network, the DNS server to register a host name of the first network device and the determined at least one IPv6 address, at least in a state in which the dynamic DNS function has been enabled, and
   wherein the second network device comprises:
   at least one memory device that stores a second set of instructions; and
   at least one processor communicatively connected to the at least one memory device of the second network device and configured by the second set of instructions to:

obtain at least a particular IPv6 address having been registered in the DNS server based on the host name of the first network device; and transmit a packet to the particular IPv6 address.

2. The network system according to claim 1, wherein the determined at least one IPv6 address is two or more IPv6 addresses.

3. The network system according to claim 1, wherein the user instruction is a selection, from the display of the at least some of the plurality of types of IPv6 addresses available for user designation for registration in the DNS server, of two or more types of IPv6 addresses to be registered in the DNS server, the two or more types selected in accordance with the user instruction being less than all of the plurality of types of IPv6 addresses.

4. The network system according to claim 1, wherein the plurality of types of IPv6 addresses includes a manually set address type, a stateless address type, and a stateful address type.

5. The network system according to claim 1, wherein the at least one processor of the first network device is further configured by the first set of instructions to receive an incoming packet transmitted from the second network device, wherein an IPv6 address of the at least one IPv6 address that the DNS server was requested to register is set as a destination address of the incoming packet.

6. The network system according to claim 1, wherein the first network device includes a printing device, and the at least one processor of the second network device is further configured by the second set of instructions to transmit the packet to request the printing device to print.

7. The network system according to claim 1, wherein the first network device comprises a printing device configured to perform printing processing according to print data transmitted from the second network device.

8. The network system according to claim 1, wherein the at least one processor of the first network device is further configured to reject an incoming packet of which a destination address is an IPv6 address associated with the first network device but has not been registered to the DNS server.

9. A network device, which is connected to a Domain Name System (DNS) server via a network, for performing IPv6-based communication, the network device comprising:
at least one memory device that stores a set of instructions; and
at least one processor communicatively connected to the at least one memory device and configured by the set of instructions to:
display at least some of a plurality of types of IPv6 addresses as available for user designation for registration in the DNS server;
receive a user instruction selecting, from the display of the at least some of the plurality of types of IPv6 addresses available for user designation for registration in the DNS server, a type of IPv6 address to be registered in the DNS server, wherein a user is permitted to select by the user instruction less than all of the plurality of types of IPv6 addresses;
determine whether or not a dynamic DNS function has been enabled;
determine at least one IPv6 address of a plurality of IPv6 addresses associated with the network device, the at least one IPv6 address corresponding to the type selected in accordance with the user instruction; and
request, via the network, the DNS server to register a host name of the network device and the determined at least one IPv6 address, at least in a state in which the dynamic DNS function has been enabled.

10. The network device according to claim 9, wherein the determined at least one IPv6 address is two or more IPv6 addresses.

11. The network device according to claim 9, wherein the user instruction is a selection, from the display of the at least some of the plurality of types of IPv6 addresses available for user designation for registration in the DNS server, of two or more types of IPv6 addresses to be registered in the DNS server, the two or more types selected in accordance with the user instruction being less than all of the plurality of types of IPv6 addresses.

12. The network device according to claim 9, wherein the plurality of types of IPv6 addresses includes a manually set address type, a stateless address type, and a stateful address type.

13. The network device according to claim 9, wherein the at least one processor is further configured by the set of instructions to receive an incoming packet in which an IPv6 address of the at least one IPv6 address that the DNS server was requested to register is set as a destination address.

14. The network device according to claim 9, wherein the network device includes a printing device.

15. The network device according to claim 9, further comprising a printing device configured to perform printing processing according to print data transmitted from a second network device.

16. The network device according to claim 9, wherein the at least one processor is further configured to reject an incoming packet of which a destination address is an IPv6 address associated with the network device but has not been registered to the DNS server.

17. A method of performing IPv6-based communication in a system that comprises first and second network devices, the first network device connected to a Domain Name System (DNS) server via a network, and the method comprising:
the first network device displaying at least some of a plurality of types of IPv6 addresses as available for user designation for registration in the DNS server;
the first network device receiving a user instruction selecting, from the display of the at least some of the plurality of types of IPv6 addresses available for user designation for registration in the DNS server, a type of IPv6 address to be registered in the DNS server, wherein a user is permitted to select by the user instruction less than all of the plurality of types of IPv6 addresses;
the first network device determining whether or not a dynamic DNS function has been enabled;
the first network device determining at least one IPv6 address of a plurality of IPv6 addresses associated with the first network device, the at least one IPv6 address corresponding to the type selected in accordance with the user instruction;
the first network device requesting, via the network, the DNS server to register a host name of the first network device and the determined at least one IPv6 address, at least in a state in which the dynamic DNS function has been enabled;
the second network device obtaining at least a particular IPv6 address having been registered in the DNS server based on the host name of the first network device; and
the second network device transmitting a packet to the particular IPv6 address, and the first network device receiving the packet transmitted from the second network device.

* * * * *